United States Patent [19]

Moyer et al.

[11] 4,423,615
[45] Jan. 3, 1984

[54] METHOD AND APPARATUS FOR PRODUCING A CONNECTOR PLATE

[75] Inventors: Anthony M. Moyer, Hollywood; Robert H. Kelly, Miramar, both of Fla.

[73] Assignee: Gang-Nail Systems, Inc., Miami, Fla.

[21] Appl. No.: 327,199

[22] Filed: Dec. 3, 1981

Related U.S. Application Data

[62] Division of Ser. No. 71,551, Aug. 30, 1979, Pat. No. 4,343,580.

[51] Int. Cl.$^3$ .................... B21D 28/02; B21D 28/14
[52] U.S. Cl. .................................. 72/326; 72/325; 72/332
[58] Field of Search ........................ 72/324–326, 72/332; 29/433; 411/457, 461, 466, 468; 52/712, 715, DIG. 6; 403/405, 283, 285

[56] References Cited

U.S. PATENT DOCUMENTS

| | | | |
|---|---|---|---|
| 3,049,042 | 8/1962 | DeLynn | 52/DIG. 6 |
| 3,178,806 | 4/1965 | Keith | 72/326 |
| 3,473,362 | 10/1969 | Black et al. | 72/326 |
| 3,603,197 | 9/1971 | Wood | 52/712 |
| 3,633,454 | 1/1972 | Schmitt et al. | 411/462 |
| 3,703,304 | 11/1972 | Losee | 52/712 |
| 3,951,033 | 4/1976 | Moehlenpah | 411/468 |
| 4,165,672 | 8/1979 | Jureit et al. | 411/461 |
| 4,235,148 | 11/1980 | Menge | 52/712 |

FOREIGN PATENT DOCUMENTS

| | | | |
|---|---|---|---|
| 749595 | 1/1967 | Canada . | |
| 339347 | 7/1921 | Fed. Rep. of Germany | 411/457 |
| 757083 | 5/1952 | Fed. Rep. of Germany | 72/325 |
| 193134 | 12/1937 | Switzerland | 411/466 |

*Primary Examiner*—Daniel C. Crane
*Attorney, Agent, or Firm*—LeBlanc, Nolan, Shur & Nies

[57] ABSTRACT

A structural joint for bearing a structural load is formed by a pair of wooden members fastened together by at least one metal connector plate. The connector plate is formed from a metal plate having a plurality of pairs of teeth punched therefrom. The teeth are punched from the plate so as to project in a direction substantially perpendicular to the plate. Each pair of teeth is struck so as to leave a corresponding longitudinally extending slot between the teeth. Each of the teeth has a knife edge portion that extends from the plate. This knife edge portion is thinner than the remaining portion of each tooth and has a sharp edge with a cross-sectional angle of less than 20°, preferably 8° to 12°, for facilitating penetration of each of the teeth into the wooden members to be secured together. These knife edge portions of the teeth are made by a metal forming process which serves to shape such portion of the teeth and simultaneously widen and elongate each tooth.

8 Claims, 8 Drawing Figures

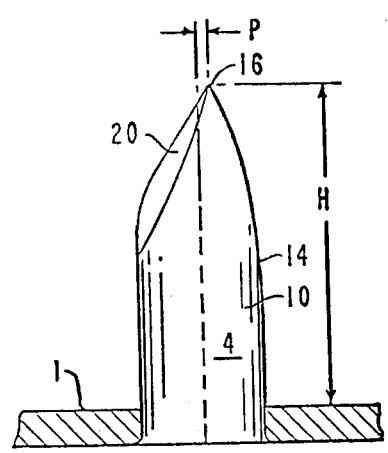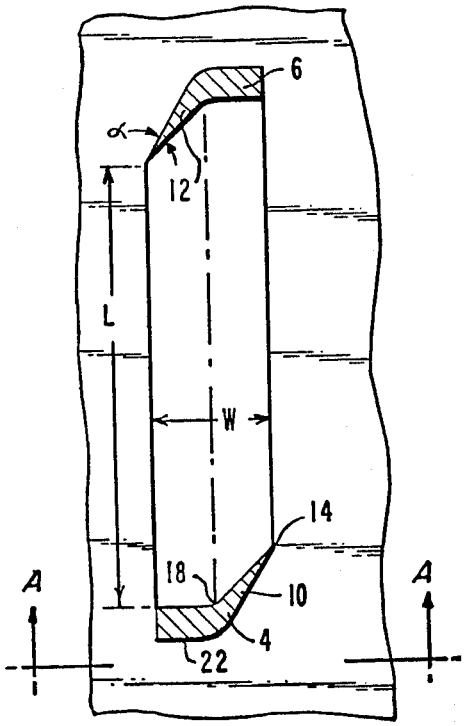
Fig. 4     Fig. 3
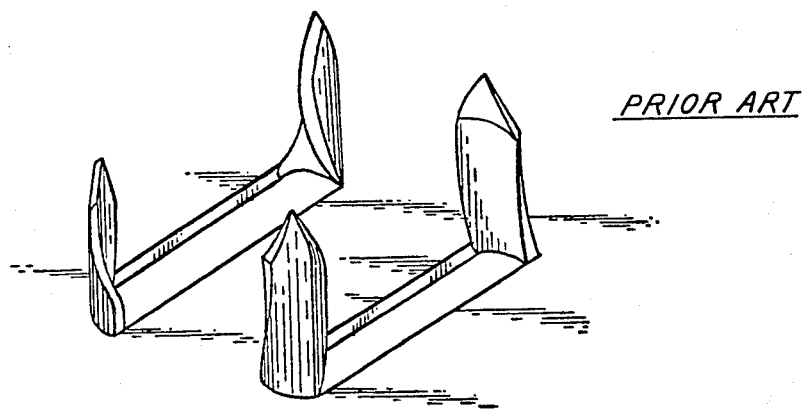
PRIOR ART
Fig. 8

METHOD AND APPARATUS FOR PRODUCING A CONNECTOR PLATE

This is a division of application Ser. No. 71,551, filed Aug. 30, 1979, now U.S. Pat. No. 4,543,580.

BACKGROUND OF THE INVENTION

The present invention involves a metal connector plate for interconnecting members such as the wooden members forming a structural joint. The invention also involves the method and apparatus for forming such connector plates. Typically, such connector plates are utilized for interconnecting adjacent wooden members for forming a structural joint such as a roof or floor truss structure as shown in U.S. Pat. No. 2,877,520 to Jureit.

When interconnecting such wooden members, the two members are arranged so as to be butted together and a connector plate is either pressed or rolled into such abutting members. If a pressing action is used, the connector plate is arranged so as to sit on top of the wooden members and then a pressing force is applied. In the alternative action, the connector plate is rolled into the wood such as shown in U.S. Pat. No. 3,479,920 to Sanford. While it has been common practice for several years to roll connector plates for forcing them into the wood, such action has lead to several deficiencies in the final product as compared to the pressed connector plates. During the rolling action, there is a tendency for the connector plate to slip until it is firmly secured to the wood. Additionally, the rolling force applies both a force perpendicular to the plate and a longitudinal force to the plate. This longitudinal force can and often did lead to bending of the teeth of the connector plates until the teeth were firmly secured by a sufficient depth in the wood. Such bending, typically referred to as a submarining effect, was especially prevelant in those situations where the teeth met with any significant resistance against penetration from the wood. Where such a submarining effect becomes significant, the teeth do not penetrate the wood as deeply as desired thereby reducing the effective strength of the structural joint.

Another problem that occurs when rolling the connector plates for forcing them into the wooden members occurs since the force of the large roller that is typically utilized has a tendency to cause the connector to conform to the shape of the roller. The curving of the plate means that the teeth when contacting the wood will be oriented at an inclined angle instead of being perpendicular to the wood. This effect increases the tendency for bending or submarining of the teeth when they enter the wooden members. This problem has been long recognized in the prior art and in fact is discussed in the above noted Sanford patent, U.S. Pat. No. 3,479,920, which discloses a connector plate specially designed for roller presses.

The strength of the structural joint is typically measured with respect to the capability of the connector plate to resist withdrawal from the wooden members when subjected to longitudinal stress and the resistance provided by the connector plate against rotation of the wooden members. While conventional plates have had a high holding capability against longitudinal forces applied along the axis of the abutted wooden members, the holding capability against rotation of the wooden members has been lower. In attempting to improve the resistance against rotation U.S. Pat. No. 3,951,033 to Moehlenpah discloses a connector plate having a plurality of pairs of teeth. The connector plate is provided with a first group of such pairs of teeth oriented in one direction and pairs of teeth oriented in a different direction. Hydro-Air Engineering, Inc. markets its P-T truss plates utilizing the designation of U.S. Pat. No. 3,951,033 FIG. 8 illustrates a perspective view of a portion of a Hydro-Air P-T plate.

The Hydro-Air connector plate, both as shown in the patent to Moehlenpah and the plate itself, has a plurality of pairs of teeth with each pair being cut from a single slot. Each tooth is twisted so as to have one section that extends further forward then the remainder of the tooth. The thickness of each tooth is substantially constant and the forward edge has a cross-sectional angle of approximately 45°. While not illustrated in the patent, in the Hydro-Air plate marketed under the patent, each tooth is twisted so as to actually lean either to the right or left, i.e., the teeth are not aligned with the slots, such as shown in FIG. 8.

The twisting of the teeth so as to lean in one or the other direction is a common phenomenon that will occur when air cutting the teeth from the metal plate. Such an air cutting process is illustrated in U.S. Pat. No. 3,685,336 to Black. While the patent to Black does show a typical air cutting process for cutting the teeth out of the plate, it does not illustrate the twisting of the nails that will typically inherently occur. Such twisting of the nails which causes them to lean in one or the other direction will lead to a further bending of the teeth in the same direction as the connector plate is rolled into the wooden members. Such bending of the nails leads to a submarining effect which will often weaken the structural joint. In essence, such a submarining effect means that the teeth are not embedded in the wood to the fullest possible extent but are bent over so as to be positioned relatively close to the surface of the wood thus being more easily withdrawn when the wooden members are placed under load. The effective result of such submarining effect on the strength of the joint will greatly vary in dependence upon the type and nature of the wood used in forming the joint. Thus, for example, in harder woods the problem is more significant.

In addition, the relatively blunt angle of the teeth of the Hydro-Air plate and as illustrated in the patent to Moehlenpah generates a greater resistance to entry of the teeth into the wood. As previously discussed such resistance to entry causes a shifting of the plate and further bending of the teeth thereby increasing the submarining effect.

Furthermore, due to the blunt angle of the edges of the teeth illustrated in the Moehlenpah patent and in the Hydro-Air plate, there is a compressing action on the wood grain when such teeth are rolled into the wooden members. Such compressing of the wood creates a tendency for the wood to collapse thereby creating a hollow space under the plate around the teeth and weakening the grip of the wood on the teeth and the structural strength of the joint.

During such an air cutting operation in the production of the connector plates, the space between the end walls of the punch and the inner end walls of the die cavity has always been greater than the thickness of the metal so that a free space remains after the teeth have been struck from the metal and pushed into the cavity. If the space was not larger than the thickness of the metal then friction would be generated as the metal was pressed against the inner end walls of the cavity thereby generating heat which could lead to a change of the shape of the die by expansion and contraction, warp the die or also possibly break the die or punch. Thus, the prior art has avoided such problems by allowing extra space in the area of the end walls of the punch and die cavity.

Another patent illustrating a connector plate having a plurality of pairs of teeth with a first group of such pairs oriented in one direction and the remainder of the teeth oriented in the other direction although the slots extend in a longitudinal direction is U.S. Pat. No. 3,603,197 to Wood. The patent to Wood illustrates a connector plate having a plurality of pairs of teeth that are substantially similar and in many ways identical to the teeth and connector plate illustrated in the above-noted patent to Moehlenpah. Other patents showing pairs of teeth cut from a connector plate with the teeth oriented in different directions are U.S. Pat. Nos. 3,094,748; 3,104,429; and 3,211,043, all to Sanford.

The connector plates are made by passing a metal sheet material in incremental steps between a set of punch and corresponding dies. The sheet material is stricken by the punches which cut the teeth and proceed to enter into the cavities of the dies so as to produce the teeth. Such procedures and the apparatus for carrying out such procedures are illustrated in U.S. Pat. Nos. 3,314,271 to Otis and 3,685,336 to Black. Both of these patents are hereby incorporated by reference. As previously discussed, the patent to Black illustrates an air cutting procedure for producing a pair of teeth struck from each slot. As shown in the patent to Black, when the punch is inserted into the cavity of the die, the distance between the punch and the inner surfaces of the die cavity is always greater than the thickness of the metal sheet material being punched. Thus, the teeth are produced inside of the cavity without actually contacting or being forced against the cavity walls.

SUMMARY OF THE PRESENT INVENTION

An object of the present invention is to provide an improved connector plate capable of being either pressed or rolled into the members to be interconnected.

Another object of the present invention is to provide an improved structural joint formed by two wooden members abutted together and interconnected by an improved connector plate.

A further objective of the present invention is to provide an improved connector plate capable of more easily penetrating the wooden members to be connected while suffering little or no bending action of the teeth of the connector plate as it is rolled into the wooden members.

Another object of the present invention is to provide a connector plate having a plurality of teeth with each a tooth having a knife edge portion with a sharp edge for facilitating entry of the teeth into the wooden members so as to limit the tendency for collapsing of the wood.

A still further object of the present invention is to provide an improved connector plate capable of providing a resistance against rotation of the wooden members interconnected by the connector plate.

Still another object of the present invention is to provide a connector plate with a knife edge portion having a cross-sectional angle of preferably less than 15°.

A still further object of the present invention is to provide a connector plate having a knife edge portion produced by a metal forming process so as to be thinner than the remainder of the tooth and so as to be harder than the material from which the tooth is struck.

Still another object of the present invention is to provide an improved connector plate having at least nine teeth struck from the plate per square inch and having a net section across the length of the plate with 63% of the steel remaining intact and a net section across the width of the plate with 33% of the steel remaining intact.

The above-noted objectives are achieved by the production and utilization of a connector plate made in accordance with the present invention. The connector plate is produced from a metal plate by an air cutting and metal forming process. The plate is provided with a plurality of pairs of elongated teeth that are struck from the plate so as to project in a direction substantially perpendicular to the plate. Each of the pairs of teeth is struck from the plate so as to leave a corresponding longitudinally extending slot between the teeth of the pair. Each of the teeth has a knife edge portion that extends from the plate. The knife edge portion of each tooth is thinner than the remaining portion of the tooth and has a sharp edge with a cross sectional angle of less than 20° and preferably less than 15°, for facilitating penetration of each of the teeth into the members to which the connector plate is to be attached.

The knife edge portions of the teeth of each pair substantially face the other tooth of the pair. Each of the teeth of each pair are substantially reverse mirror images so that their knife edge portions extend in the same direction around the slot. A first group of pairs of teeth of the connector plate have their knife edges extending in one direction around the slot while the other pairs of the teeth of the connector plate have their knife edges extending in the opposite direction around the slot.

Since each of the knife edge portions of the teeth is formed by a metal forming process, such portions are harder than the metal from which the tooth is made. The increase in hardness of the tooth along with the sharpness of the knife edge portion improves the capability of the tooth to slice through the wood and to penetrate the wood as the connector plate is rolled into the wooden members. Ideally, the knife edge portion should have a sharp edge with a cross sectional angle of between 8 and 12°. In addition, the knife edge portion from the tip of the tooth extends along an arcuate path toward the metal plate. Such an arcuate path also helps to facilitate penetration of the tooth into the wood.

During the metal forming process of producing the teeth, the section of the tooth forming the knife edge is wiped against the inner wall of the cavity by an end wall of the punch. This wiping, or metal forming, action increases the width of this portion of the tooth so that the overall width of the tooth increases from approximately 0.094 inches to 0.125 inches. Simultaneously, the length of the tooth is also increased by approximately 0.025 inches due to the wiping, or metal forming action. Thus as a result of the metal forming process, the size and shape of the tooth along with its thickness are changed. In addition, however, due to the construction of the punch and the corresponding formation of the cavity of the die, the teeth are forced to be substantially aligned with the corresponding slots. The pointed tip of each tooth substantially lies along the longitudinal center line of its corresponding slot with the only distance between alignment being relatively minor; this distance is referred to as the point offset.

The inner surface of each tooth is approximately "V-shaped". The outer surface of each tooth, however, is approximately rounded in its cross-sectional shape. While the knife edge of each tooth follows an arcuate path extending from the tip towards the base of the tooth, the other edge of the tooth is angular in shape. Preferably, there should be at least 9 teeth per square inch and ideally, there are approximately 9.5 teeth per square inch.

In producing the connector plates of the present invention, the sheet metal material from which the plate is to be formed is incrementally passed between a series of punches and corresponding dies. The punches and dies are arranged so that each punch will strike the metal plate and pass through the plate so as to extend into a cavity of a corresponding die. When the punch extends into the cavity of the die, a substantial portion of the space between the lateral side edges of each punch and corresponding die is less than the thickness of the sheet metal plate. Thus, as the punch enters into the cavity of the die metal forming occurs whereby the teeth are reshaped by wiping the metal between the side walls of the punch and the die cavity. In this manner, the knife edge portion of each tooth is formed with a thickness less than the rest of the tooth and having a sharp edge with a cross-sectional angle of ideally between 8 and 12°.

While the teeth will initially be twisted when the punch begins to enter the die cavity, similar to the twists that exist in the Hydro-Air plate, as the punch is fully inserted into the die cavity, each tooth will be forced into a position vertically aligned with the slot and rotated so that the knife edge portion of each tooth extends along a longitudinal side of the slot by a distance greater than the other side of the same tooth. The metal forming operation for producing the knife edge portion of each tooth also increases the hardness of such portion and increases the width of the tooth as compared to the width when first cut from the plate.

The punch press for punching the connector plates includes upper and lower relatively movable die shoes such as shown in U.S. Pat. No. 3,314,271 to Otis. A punch is secured to one of the shoes and a corresponding die for receiving the punch is secured to the other shoe. When the metal stock material passes through the press between the shoes, the punch strikes the metal stock material, passes through the material and passes into a cavity of the die which serves to receive the punch. As the punch cuts through the metal stock material, it cuts a pair of teeth of the connector leaving a slot between the teeth. The punch and the cavity of the die are constructed so that when the punch extends into the cavity a portion of the space at the lateral end walls is less than the thickness of the metal stock material thereby causing the teeth to be shaped between the punch and the die by a metal forming action. Such metal forming action occurs when the metal material is extruded between the punch and interior walls of the die cavity; this serves to form the knife edge portions of the teeth and also widens and elongates the teeth.

When the punch is inserted into the cavity of the die, a pair of corresponding opposite corners of both the punch and the cavity each form an angle therebetween of preferably less than 15° and are spaced from each other by a distance less than the thickness of the metal stock material to be punched. Thus, as each tooth is punched and shaped by the metal forming action so as to form the knife edge portion, this portion should be provided with a sharp edge having an angle of less than 15°. Ideally, the sharp edge should have an angle of between 8 and 12° and accordingly the angle between the punch and cavity at the aforementioned opposite corners should be between 8 and 12°.

The punch and the cavity of the die each have 6 side walls around its circumference. The cavity has two longitudinal parallel side walls, two partial lateral parallel side walls, which are perpendicular to the longitudinal side walls, and two slanted side walls, which are located at opposite corners of the die. Each of the slanted side walls of the cavity at one end is attached to the adjacent longitudinal side wall of the cavity so as to form an angle with such wall of between 30 and 40°. The punch has two longitudinal parallel side walls, two partial lateral side walls, which are perpendicular to the longitudinal side walls, and two slanted side walls, which are located at opposite corners of the punch. Each of the slanted side walls is attached to the adjacent longitudinal side wall of the punch and forms an angle with such longitudinal side wall of between 40 and 50°. The face surface of the punch that initially contacts and cuts the metal stock material has a primary cutting edge at its upper end. This primary cutting edge extends along a diagonal between the two longitudinal side walls of the punch and forms an angle with a longitudinally extending line along each of the longitudinal side walls of between 30 and 45°. The face surface of the punch also has two metal shaping surfaces. Each of the metal shaping surfaces extends from the cutting edge to a respective one of the longitudinal side walls. Each of the metal shaping surfaces is dimensioned for causing rotation of the corresponding tooth so that the knife edge portion of such tooth extends further along the slot between the pair of teeth than the other side of the same tooth while simultaneously causing such tooth to project from the metal stock material free of any twist. Thus, each tooth stands in a substantially vertical manner free of the type of twist present in the Hydro-Air plates such as shown in FIG. 8. Each of the metal shaping surfaces has one side extending from one of the longitudinal side walls of the punch at the end of the cutting edge across the face surface of the punch to the opposite longitudinal side wall with such side of the metal shaping surface forming an angle of between 52 and 58° with a horizontal plane lying along the cutting edge.

BRIEF DESCRIPTION OF THE DRAWINGS

FIG. 3 is a cross-sectional view of a pair of teeth of the connector plate illustrated in FIG. 1.

FIG. 4 is a side elevational view along lines A—A of FIG. 3.

FIG. 8 is a perspective view of a portion of a prior art connector plate.

DESCRIPTION OF THE PREFERRED EMBODIMENT

Figure 1:
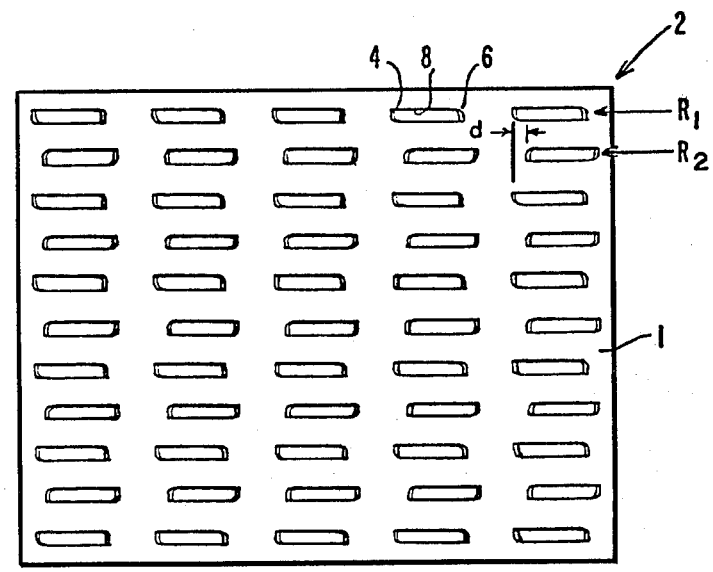
FIG. 1 is a bottom plan view of a connector plate in accordance with the present invention with the teeth shown extending up from the plate.

A connector plate for connecting together wooden members in the construction of a structural joint has a plurality of pairs of teeth struck therefrom such as shown in FIG. 1. Each pair of teeth, such as teeth 4 and 6 are struck so as to form a slot 8 therebetween. Connector plate 2 has a plurality of rows of such pairs of teeth such as rows R1 and R2. The rows of teeth extend longitudinally along the connector plate. Typically, the connector plate is elongated along its longitudinal direction. The adjacent rows of teeth are offset from each other by a distance d, which is referred to as the stagger distance. In addition, the space between each pair of teeth along each row should be approximately equivalent to one half of the length of the slot.

Figure 2:
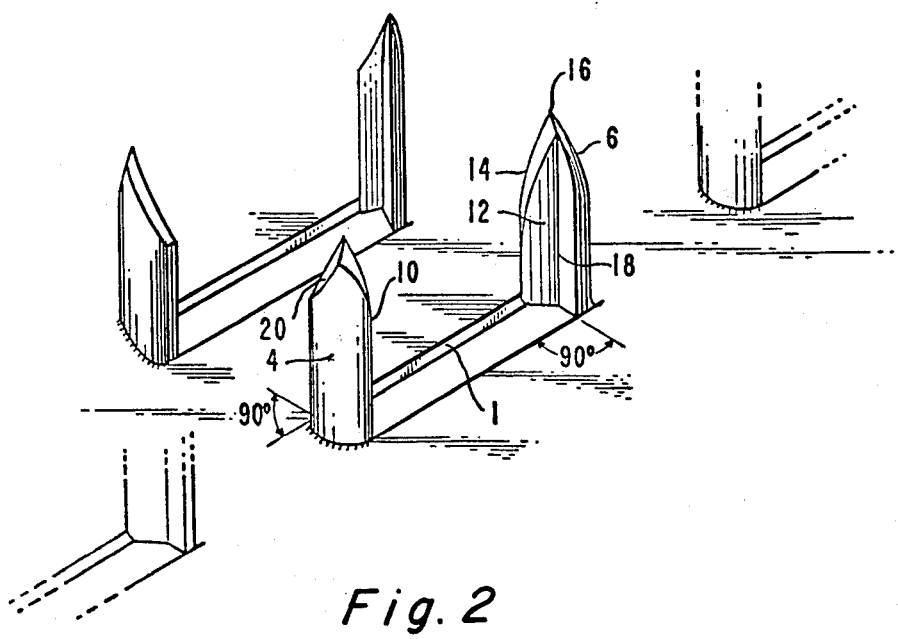
FIG. 2 is a perspective view of a portion of the connector plate shown in FIG. 1.

Each tooth is provided with a knife edge portion, such as portion 10 of tooth 4 and portion 12 of tooth 6, as shown in FIG. 2. Each knife edge portion has a sharp edge 14 with a cross-sectional angle of ideally 8 to 12°. The sharp edge 14 of each of the knife edge portions has an arcuate shape extending from the tip 16 of the tooth towards the metal stock material 1.

The cross-sectional shape of each of the teeth is more clearly shown in FIG. 3. As shown, tooth 4 has a knife edge portion 10 with sharp edge 14. Each of the sharp edges has an arcuate shape such as shown on knife edge portion 12. The outer surface of each tooth is rounded such as shown by outer surface 22. The inner surface of the tooth is approximately V-shaped such as shown by inner surface 18.

Viewing the tooth from a direction facing the outer surface, such as shown in FIG. 4, it can be seen that the tooth extends in a direction substantially perpendicular to the metal stock material 1 forming the connector plate. Each tooth, therefore, is substantially aligned with the slot and is not leaning in either direction such as shown in the prior art connector illustrated in FIG. 8. The tip 16 of tooth 4 is substantially aligned along the longitudinal center of the slot, only being offset by a minor distance p referred to as the point offset. Sharp edge 14 of knife edge portion 10 has an arcuate shape. The other side of the tooth has an angular shape 20 such as shown in FIG. 4.

A first group of the pairs of teeth will have their knife edges extending in a first direction around the slot such as shown in FIG. 3. The remaining pairs of teeth, however, have their knife edges extending in the opposite direction around the slot. In this manner, while the first group of teeth will provide a lateral resistance against rotational forces in one direction, the second group of pairs of teeth will provide resistance against rotational forces in the opposite direction. The first group of teeth are formed by a type A punch and die assembly while the second group of pairs of teeth are formed by a type B punch and die assembly. The type B punch and die assembly is merely a reversed image of the type A punch and die assembly. The teeth of each pair of teeth ideally have the same shape and are reverse mirror images of each other.

In accordance with the preferred embodiment of the present invention, the connector plate can be made of 20 gauge metal or alternatively 18 gauge. The length L of the sot, which is shown in FIG. 3, is approximately 0.442 inches. The width W of the slot shown in FIG. 3 is approximately 0.094 inches. The height H of each tooth is approximately 0.312 inches and the width of each tooth is approximately 0.125 inches. The width of the tooth upon completion of the metal forming process is larger than the width of the slot. The included angle of the sharp edge of the knife edge portion is approximately 10°.

Figure 5:
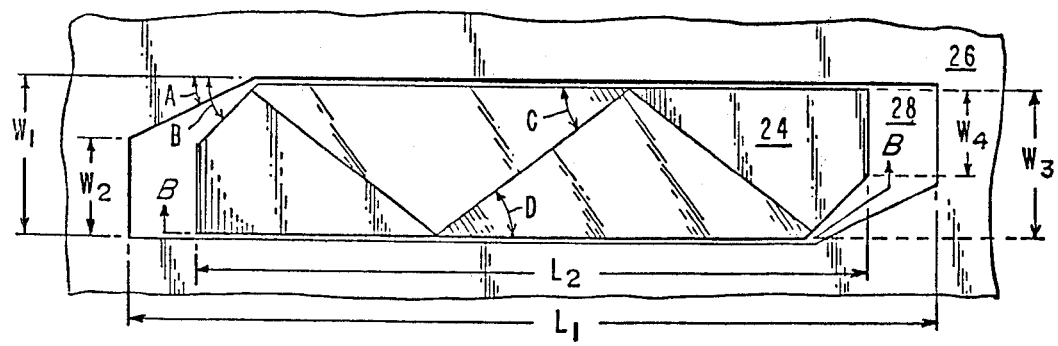
FIG. 5 is a bottom plan view of a punch within a die cavity, with the punch and die illustrated being an A type punch and die.
Figure 6:
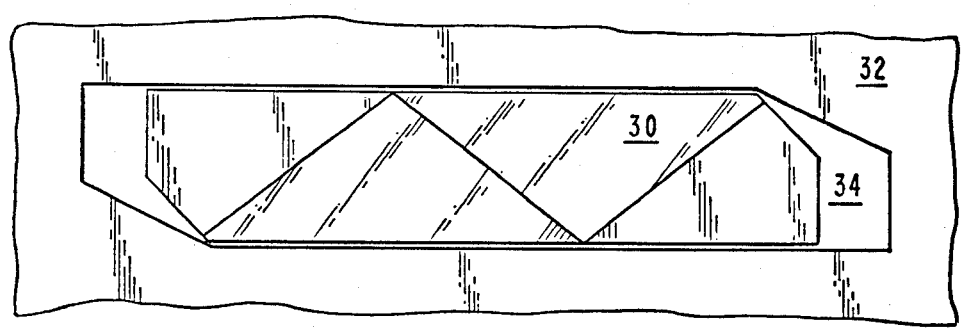
FIG. 6 is a bottom plan view similar to FIG. 5 except that a B type punch and die are illustrated.
Figure 7:
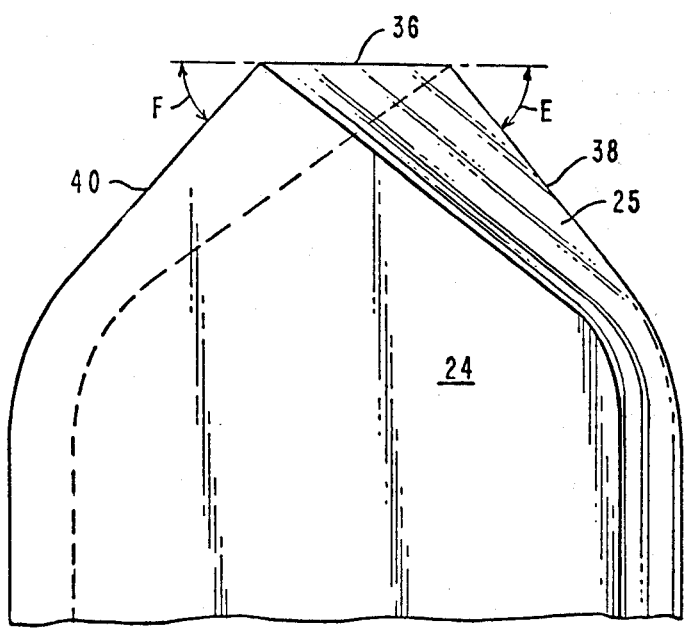
FIG. 7 is a side elevational view of a portion of the punch illustrated in FIG. 5 taken along lines B—B.

The punch and dies for forming the teeth of the connector plate of the present invention are illustrated in FIGS. 5 through 7. As previously indicated FIG. 5 shows the first punch and die arrangement, which can be referred to as the type A embodiment and FIG. 6 shows the reverse punch and die arrangement which can be referred to as the type B embodiment. The type A and type B embodiments are alternately arranged along a lateral row with each of the adjacent punch and die assemblies being offset by the stagger distance d so as to cause the corresponding stagger distance d between the adjacent pairs of teeth of the connector plates such as shown in FIG. 1.

Die 26 has a cavity 28 for receiving punch 24. The cavity of die 26 has two longitudinal parallel side walls, two partial lateral side walls and two slanted side walls, such as shown in FIG. 5. The slanted side walls are arranged at opposite corners of the die cavity and form an angle A with the longitudinal side wall of between 30 and 40°. The lateral side walls of the die cavity are spaced by a distance L1. The distance between the lateral side walls of the die cavity is W1. The lateral parallel side walls have a width W2. In the preferred embodiment, L1 is 0.518 inches, w1 is 0.104 inches, w2 is 0.064 inches and angle A is 35°.

Punch 24 is also six sided and has two longitudinal parallel side walls, two partial lateral parallel side walls and two slanted side walls. The slanted side walls are connected to the longitudinal walls of the punch and form an angle B of between 40 and 50°. The distance between the lateral side walls of the punch is L2. The width of the entire punch is w3 and the width of the lateral side wall is w4. In accordance with the preferred embodiment, L2 is 0.442 inches, w3 is 0.094 inches, w4 is 0.057 inches and angle B is 45°. The thickness of the 20 gauge metal stock material is approximately 0.0396 inches. Thus, a metal forming operation which causes shaping and thinning of the metal takes place in the area between the slanted side walls of the punch and cavity so as to form the knife edge portion with this portion having a cross-sectional angle of 10° in accordance with the preferred embodiment.

The angles, lengths and widths of the type B embodiment as shown in FIG. 6 would be similar to those in the type A embodiment of FIG. 5. In the type B embodiment there is a punch 30 that enters cavity 34 of die 32.

Turning now to the face surface of punch 24 with reference to FIGS. 5 and 7, it is seen that the punch has a cutting surface 36 at its uppermost end. Cutting edge 36 is the cutting edge that initially strikes the stock metal plate for creating a slit that serves to produce the two teeth. Cutting edge 36 forms angles C and D with the longitudinal side walls of the punch. Angles C and D should be the same and the angles should be between 30 and 45°. Extending down from cutting edge 36 are two metal shaping surfaces 25. The sides 38 and 40 of the two metal shaping surfaces are oriented at angles E and F, respectively, with respect to a horizontal line extending along cutting edge 36. Angles E and F should be identical and should be between 52 and 58°. In accordance with the preferred embodiment of the present invention, angles C and D are 35° and angles E and F are 55°.

During the punching operation, after cutting edge 36 pierces a metal stock plate for cutting the two pointed ends of the teeth, punch 24 continues to be inserted into the cavity. As punch 24 moves in a piercing direction into the cavity, a metal forming operation occurs between the slanted side walls of the punch and the die cavity. In addition to this metal forming operation, metal shaping surfaces 25 rotates the teeth so that they extend from metal stock material 1 in a substantially vertical direction free of any twist. In this regard, if the angle between the upper edge of the metal shaping surface and the horizontal line along cutting edge 36 of the punch is too large then this will decrease the capability of the punch for rotating the teeth so that the forward edge of the knife edge portion extends further forward along the slot than the other side of the tooth. If the angle of this edge of the metal shaping surface is too small then the metal shaping surface will be unable to remove the twist from the tooth and a twist such as shown in the prior art connector plate of FIG. 8 will occur.

In accordance with the preferred embodiment of the present invention, each pair of teeth extending along a longitudinal row of the connector plate is spaced from the next pair of teeth by a distance of approximately 0.339 inches. The lateral distance between each pair of teeth in accordance with the preferred embodiment is approximately 0.176 inches. The length of each slot in accordance with the preferred embodiment is approximately 0.442 inches and the width of each slot in accordance with the preferred embodiment is approximately 0.094 inches. The stagger distance between the pairs of teeth in adjacent rows is approximately 0.089 inches. In any net section extending lengthwise along the connector plate, ideally approximately 63% of the steel remains, i.e., the percentage of steel in which no slots have been formed. The percentage of steel remaining in a net section across the width of the connector plate is approximately 33%. The number of nails cut from the plate is preferably 9.5 nails per square inch.

The present invention may be embodied in other specific forms without departing from the spirit or essential characteristics thereof. The present embodiments are presented merely as illustrated and not restrictive, with the scope of the invention being indicated by the attached claims rather than the foregoing description. All changes which come within the meaning and range of equivalency of the claims are therefore intended to be embraced therein.

The embodiment of the invention in which an exclusive property or privilege is claimed is defined as follows:

1. A method for producing a connector plate made from a sheet metal plate, such connector plate having a plurality of pairs of teeth projecting from the plate with such teeth being struck from the plate by an air cutting and metal forming process, said method comprising the steps of: arranging a portion of the plate between a punch press and die with the punch press having punches cooperating with die cavities in the die and, when each punch is inserted into the die cavity, each corresponding punch and die cavity have circumferences defined by corresponding opposed longitudinal side walls and lateral end walls, each of the lateral end walls having a slanted section, where a substantial portion of the space between the slanted sections of the lateral end walls of each inserted punch within the corresponding die cavity, is less than the thickness of the sheet metal plate; breaking the metal plate by striking it with each punch; and moving each punch into the corresponding die cavity so as to cause two teeth to be struck from the sheet metal plate and leaving a slot between such teeth; forming the metal teeth by wiping the metal between the slanted sections of the lateral end walls of each punch and corresponding die cavity so as to reshape and to extrude a portion of each tooth and develop a knife edge portion of each tooth with such knife edge portion having a cross-sectional thickness which is thinner than the remaining portion of the tooth and having a sharp edge with a cross-sectional angle of between 8 and 12°, said sharp edge of each knife portion extending from said pointed tip of each of the respective said teeth along a continuous substantially arcuate path to said metal plate for facilitating penetration of each of said teeth into a member to which said connector plate is to be attached.

2. A method according to claim 1 wherein during the steps of metal forming each tooth is forced into a position vertically aligned with the slot and rotated into a position so that the knife edge portion of each tooth extends along a longitudinal side of the slot a distance further than the other side of the same tooth.

3. A method according to the process of claim 2 wherein the metal forming operation for developing the knife edge portion of each tooth increases the hardness of such portion and increases the width of the tooth as compared to its width when first cut from the plate before the metal forming action.

4. A method according to claim 3 wherein said metal forming process forces a reshaping of the metal tooth so as to widen the knife edge portion of the tooth and elongate the tooth.

5. A method according to claim 4 further comprising the step of incrementally advancing the metal plate between the punch press and die for striking a plurality of pairs of teeth.

6. A punch press and die for punching pairs of teeth from connector plates formed of metal stock material, comprising: upper and lower relatively moveable die shoes; a punch and die with said punch being secured to one of said shoes and said die being secured to the other of said shoes for operating on the metal stock material passing through said press between said shoes; said die having a cavity for receiving said punch; said punch being aligned so as to cut through the metal stock material and to enter said cavity of said die for cutting a pair of teeth of the connector from the metal stock material with a slot between each pair of teeth; said punch and said cavity each having six side walls around the circumference thereof, including two longitudinal parallel side walls, two partial lateral side walls that are perpendicular to the respective longitudinal side walls and two slanted side walls at opposite corners of said punch and said cavity, respectively; said slanted side walls forming a pair of corresponding opposite opposing walls of said punch and said die each forming an angle between such opposing walls of less than 15°; each slanted side wall of the cavity being attached to the adjacent longitudinal side wall of the cavity and forming an angle of between 30 and 40° with said longitudinal side wall; each slanted side wall of said punch being attached to the adjacent longitudinal side wall of the punch and forming an angle of between 40 and 50° with said longitudinal side wall; said punch having a face surface that initially contacts the metal stock material to be punched, said face surface having a primary cutting edge at its uppermost end for cutting an initial opening in the metal stock material and forming the pair of teeth, said primary cutting edge extending on a diagonal between the longitudinal side walls of the punch and forming an angle with a longitudinally extending line along each of said longitudinal side walls of between 30 and 45°.

7. The punch press and die of claim 6 wherein said angle between said opposing walls of said punch and said die is between 8 and 12°.

8. The punch press and die of claim 6 wherein said face surface of said punch has two metal shaping surfaces, each of said metal shaping surfaces extending from said primary cutting edge to a respective one of said longitudinal side walls, and each metal shaping surface having one side extending from one of said longitudinal side walls of said punch at the end of said primary cutting edge across said face surface of said punch to the opposite said longitudinal side wall with such side of said metal shaping surface forming an angle of between 52 and 58° with a horizontal plane lying along said primary cutting edge.

* * * * *